US008925455B2

(12) United States Patent
Foley

(10) Patent No.: US 8,925,455 B2
(45) Date of Patent: Jan. 6, 2015

(54) SELF-LUBRICATING SEAL FOR ENCLOSED DOCTOR BLADE ASSEMBLY

(76) Inventor: Anthony Foley, Tampa, FL (US)

( * ) Notice: Subject to any disclaimer, the term of this patent is extended or adjusted under 35 U.S.C. 154(b) by 570 days.

(21) Appl. No.: 13/223,591

(22) Filed: Sep. 1, 2011

(65) Prior Publication Data

US 2012/0049465 A1 Mar. 1, 2012

Related U.S. Application Data

(60) Provisional application No. 61/379,158, filed on Sep. 1, 2010.

(51) Int. Cl.

*B41F 31/02* (2006.01)
*F16J 15/16* (2006.01)
*B41F 9/06* (2006.01)

(52) U.S. Cl.

CPC ............... *B41F 31/027* (2013.01); *B41F 9/065* (2013.01); *B41P 2200/12* (2013.01)
USPC ....................................................... 101/350.6

(58) Field of Classification Search

CPC ........ B41F 31/027; B41F 31/02; B41F 9/065; F16J 15/16; F16J 15/025
USPC .................................... 101/350.1, 350.6, 364
See application file for complete search history.

(56) References Cited

U.S. PATENT DOCUMENTS

| | | | | |
|---|---|---|---|---|
| 5,012,734 | A | 5/1991 | Martin | |
| 5,125,341 | A | 6/1992 | Yaeso | |
| 5,150,651 | A * | 9/1992 | Flores | 101/207 |
| 5,410,961 | A | 5/1995 | DeNicola et al. | |
| 6,629,496 | B1 | 10/2003 | Boose et al. | |
| 6,672,207 | B2 | 1/2004 | Kolbe et al. | |
| 6,739,248 | B2 | 5/2004 | Kolbe et al. | |
| 7,597,761 | B2 * | 10/2009 | Van Denend | 118/410 |
| 2003/0150342 | A1 | 8/2003 | Kolbe et al. | |
| 2008/0034997 | A1 | 2/2008 | Van Denend | |
| 2009/0193990 | A1 * | 8/2009 | Van Denend | 101/350.6 |

OTHER PUBLICATIONS

Mohamed-Karim, Hajji, "Extended European Search Report," for European App. No. EP 11 17 9786, mailed Sep. 25, 2012, Munich, Germany.

Tri-X Incorporated, screenshots from webpage http://www.inkmetering.com/, Aug. 31, 2011, Mar. 13, 2010, Tampa, Florida USA.

* cited by examiner

*Primary Examiner* — Daniel J Colilla
*Assistant Examiner* — Leo T Hinze
(74) *Attorney, Agent, or Firm* — Woods Oviatt Gilman LLP; Katherine H. McGuire, Esq.

(57) ABSTRACT

A self-lubricating end seal, a pair of which are used to seal the opposite ends of the fluid reservoir of a doctor blade assembly, the top and bottom of which are enclosed by a pair of doctor blades which engage with a roller to transfer fluid to the roller. The seal includes a substantially rectilinear lubrication channel which may be divided into separate lubrication compartments packed with lubricant prior to attachment to the doctor blade assembly.

10 Claims, 9 Drawing Sheets

SELF-LUBRICATING SEAL FOR ENCLOSED DOCTOR BLADE ASSEMBLY

BACKGROUND OF THE INVENTION

The present invention generally relates to doctor blade assemblies which define an enclosed fluid reservoir for applying fluid to a rotating roller, and more particularly relates to a self-lubricating end seal used to seal the opposite ends of the fluid reservoir, the top and bottom of which are enclosed by a pair of doctor blades which engage with the roller.

Enclosed doctor blade assemblies are used extensively in machinery utilizing a rotating roller that picks up fluid from a reservoir and deposits the fluid onto another surface located opposite the doctor blade assembly. Examples of such machinery include rotary printing units such as flexographic printing machines. Such enclosed doctor blade assemblies can also be utilized for the application of varnish, adhesives and various specialty coatings, for example. In a flexographic printing station, the enclosed doctor blade assembly delivers ink to the surface of an engraved roller, often referred to as the anilox roll. The surface of the anilox roller contains engraved microscopic cells that carry and deliver a pre-determined quantity of ink to the surface of the printing plate.

The enclosed doctor blade assembly is intended to form an intimate seal with the surface of the anilox roller. The top and bottom, longitudinal surfaces of the assembly are sealed by means of two doctor blades. The doctor blades are mounted to the reservoir and positioned in parallel, spaced relation to each other and are directed at strategic angles to engage the free edges of the doctor blades with the surface of the anilox roller. The doctor blades extend the full length of the anilox roller. The function of each doctor blade is determined by the rotational direction of the anilox roller with one blade metering the ink or other fluid from the surface of the anilox roller while the other blade simply acts in an ink containment role, holding ink within the reservoir (see, for example, U.S. Pat. No. 5,125,341). In such enclosed doctor blade assemblies, the reservoir and doctor blades contain the fluid except at the opposite ends thereof which are open and must be closed with specially configured seals to completely enclose the reservoir and ensure the fluids (e.g., printing ink and cleaning solutions) do not unintentionally leak from the enclosed fluid reservoir. The part of the seal that faces the radial surface of the anilox roller comes into direct contact with the surface of the anilox roller when the enclosed doctor blade assembly is put into operation. The remaining surfaces of the seal are in contact with the inner surfaces of the two doctor blades and the frame forming the reservoir of the enclosed doctor blade assembly.

Traditional doctor blade assembly end seals are manufactured from compressible foam and rubber materials which are very susceptible to uncontrolled deformation and dislodgement from the ideal operating position relative to the surface of the anilox roller, particularly when exposed to changes in the internal operating pressure of the enclosed fluid reservoir during normal operation, as well as the inherent mechanical drag applied by the rotation of the anilox roller, especially at elevated press speeds. Once dislodged from the correct operating position the normal life expectancy of the seal is shortened considerably and ink leakage starts almost immediately. Even if such a seal is not completely dislodged from the fluid reservoir frame, even minor unintended deformation or seal movement within the frame immediately leads to premature wear and some degree of unwanted leaking of the ink or other fluid from within the enclosed ink reservoir. Press operators are then forced to stop the machine production to change/replace the worn or dislodged seals. There is also excessive cost associated with the wasted ink as well as additional cleaning of the machine and various press components that are exposed to the leaking ink.

The surface of the anilox roller is quite hard (e.g., 1250-1300 Hv (Vickers scale; equivalent to Shore C +70) and abrasive due to the fluid-holding cells engraved into it which act to coat fluid onto the roller surface as it rotates through the fluid reservoir. As such, the end seals are exposed to significant abrasive wear as the anilox roller rotates, particularly at very high speeds which result in a proportional increase in the COF (coefficient of friction) and mechanical stress applied to the seals. New servo-drive, gearless flexographic presses have dramatically increased the machine production speeds that can be obtained. As the rotational speed of the anilox roller is increased, there is a proportional decrease in the life-expectancy of the surface of the seals in contact with it. Thus, as machine speeds have continued to increase, the industry has seen the prior art seals wearing out or otherwise failing faster than ever before.

Besides being subjected to abrasive wear, the end seals are also exposed to various levels of hydraulic pressure applied by the reservoir fluids (e.g., the printing ink and cleaning solutions) that are pumped into and out of the reservoir during normal operation of the press. The wear rate of the surface of the seals in contact with the anilox roller is thus directionally proportional to the anilox roller surface abrasiveness, hydraulic pressure applied by the reservoir fluids, and the speed at which the anilox roller is turning (rpm's). This rapid wear of the seals results in a considerable decrease in productivity due to the press operator having to frequently stop the printing press to replace worn, dislodged or leaking end seals in each of the print stations. A typical gearless flexographic press will have between eight and ten print stations having a pair of seals in each. In addition, modern servo presses are typically equipped with an automatic wash-up feature that facilitates very quick transition to the next print job. During the switch from one print job to the next the automatic wash-up cycle is initiated and any ink that remains in the enclosed ink reservoir from the completed job is extracted using suction and then charged (pumped) with cleaning solution. This cleaning cycle exposes the seals to varying degrees of negative followed by positive hydraulic pressure as ink is removed and cleaning solution is pumped/sprayed through nozzles and circulated within the reservoir of the enclosed doctor blade assembly. During the ink extraction stage and delivery of cleaning solution to the enclosed ink reservoir, a significant change in the internal operating pressure of the ink reservoir occurs due to the suction required to remove the left-over ink as well as the cleaning solution once the cleaning cycle is complete. This change in internal pressure within the enclosed ink reservoir has been known to dislodge one or both the end seals from their ideal operating position, leaving the seals incorrectly oriented relative to the surface of the anilox roller. If the machine is then operated with the end seals in an incorrect orientation relative to the curved surface of the anilox roller, the end seal wears rapidly (similar to having unbalanced tires on a car) which, if not caught by the operator, results in a loss of intimate contact with the surface of the anilox roller which in turn allows ink to enter the area where the seal makes contact with the surface of the anilox roller. Once the printing ink enters this area (between the surface of the seal facing the roller and the anilox roller) the ink starts to dry which then adds to the rate of abrasive wear on the seal. Compounding the problem is that the new gearless press technology runs at 2-3 times the production speed of conventional gearless presses. As such, there is a significant increase in the level of mechanical stress applied to the end seals in the rotary direction where it makes contact with the surface of the anilox roller.

There thus remains a strong need in the industry for enclosed doctor blade end seals which are much more durable and failure resistant than the end seals which have been used to date.

SUMMARY OF THE INVENTION

The present invention addresses the above described problems with prior art end seals by providing, in a first aspect of the invention, an end seal for an enclosed doctor blade assembly with an improved geometry which inhibits seal failure due to unintended seal movement. The present invention addresses the problems of prior art end seals by providing, in another aspect of the invention, a self lubricating feature designed to decrease the rate of seal wear and improve the engagement of the seal with the roller surface. A pair of such seals are used to seal the opposite ends of the doctor blade assembly which includes an elongated reservoir frame having a channel (preferably, but not necessarily concave in cross-section) on one side for positioning in facing relation to an engraved anilox roller. The enclosed doctor blade assembly further includes first and second doctor blades affixed to and traversing the reservoir frame in parallel, spaced relation to each other on opposite sides of the reservoir channel. Each end of the enclosed doctor blade assembly is sealed with the inventive seal which forms a resilient barrier together with the reservoir channel and longitudinally extending edges of the doctor blades when engaged against the surface of the anilox roller in an operational position. The portion of each seal which faces and contacts the surface of the anilox roller defines a lubrication channel that is pre-packed with a viscous lubricant which creates a firm seal with the surface of the anilox roller. The lubrication channel provides a self-lubricating feature to facilitate extended life of the seal. The lubrication channel on the seal is unique as it contains and distributes anti-friction lubricant (lubricant is applied into the lubrication channel after the seal is manufactured using the injection molding process) which acts to extend the operational life of the seal. The lubrication channel is defined by two or more spaced, rigid sidewalls which come into contact with the surface of the anilox roller, as well as one or more but preferably three precisely oriented restrictor webs extending substantially perpendicular to the sidewalls. The three restrictor webs form four distinct lubrication compartments within the lubrication channel that ensures even distribution of the lubricant from top to bottom of the lubrication channel during normal operation of the machine (e.g., printing press) when the seals are in contact with the surface of the anilox roller. In addition, the three restrictor webs within the lubrication channel act to strengthen the two sidewalls which aids in discouraging unintended movement of the sidewalls when engaged against the surface of the anilox roller under load. The top surface of each sidewall that contacts the surface of the anilox roller is smooth and extends at an angle in a downwardly manner in a direction toward the center of the lubrication channel. The geometry and smooth surface on the top of the sidewalls also allows the lubrication channel to perform in the manner of a suction cup when engaged against the surface of the anilox roller under normal load.

DETAILED DESCRIPTION OF A PREFERRED EMBODIMENT

Figure 1A:
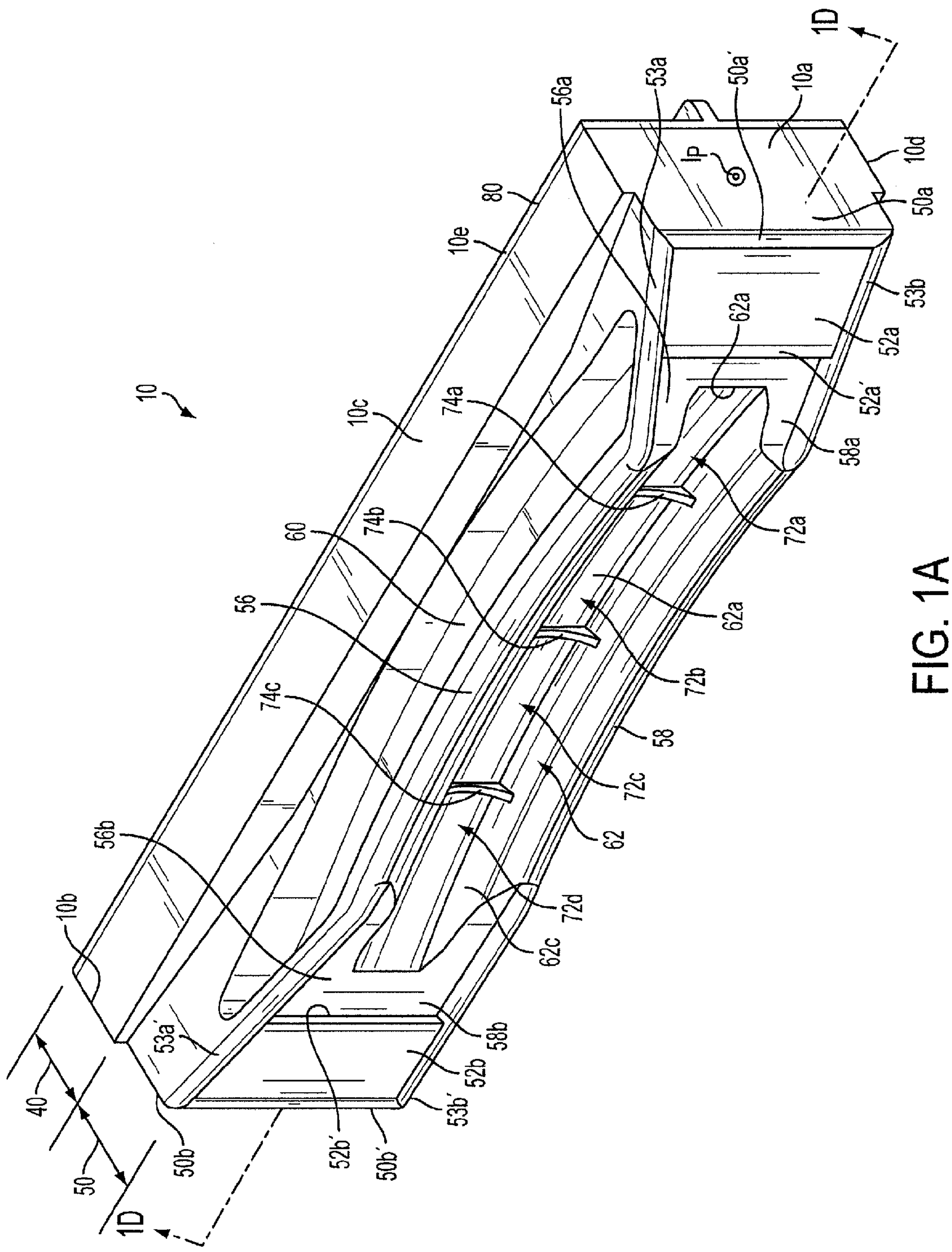
FIG. 1A is an enlarged perspective view of a preferred embodiment of the inventive seal.
Figure 5:
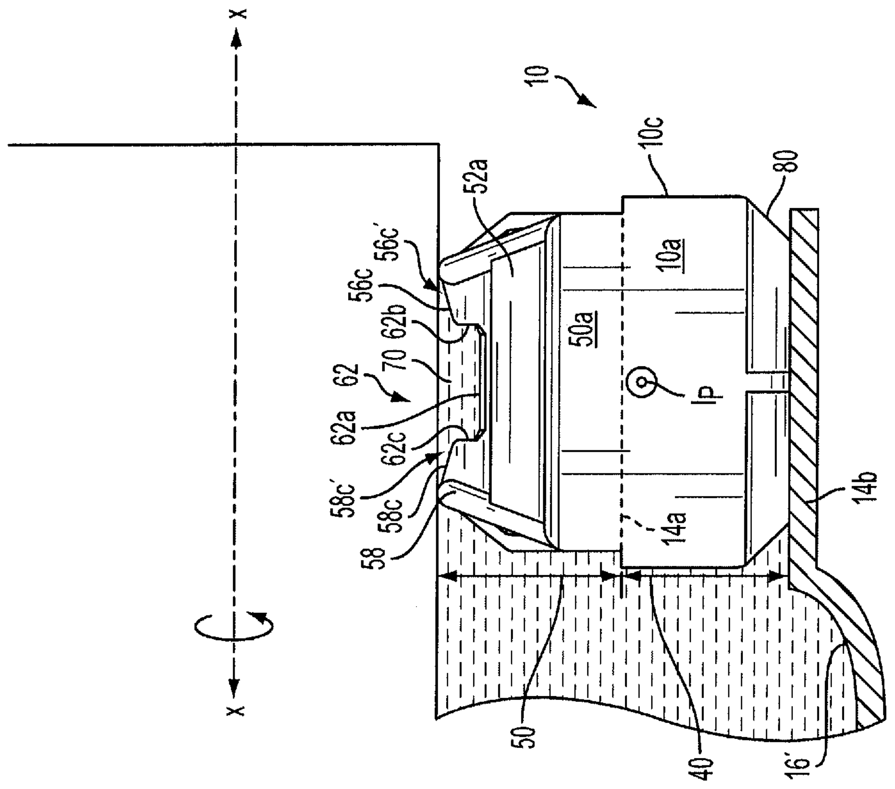
FIG. 5 is an end view thereof as viewed from the right of FIG. 2.

Referring now to the drawing, there is seen in the various figures an embodiment of the inventive seal designated generally by the reference numeral 10. Seal 10 is preferably formed from a from a rigid yet resilient material (e.g., about 25-90 Durometer Shore A, more preferably about 60-80 Shore A, and yet more preferably about 70 Shore A) which may be injection molded from an appropriate material such as, for example, EPDM rubber, Buna-N rubber, Natural Rubber, or compounds having like characteristics, although other manufacturing processes are of course possible (e.g., cast molding, machining, SLA, etc.). In the presently preferred embodiment of an injection molded seal, as seen in FIGS. 1A and 5, one end wall 10*a* of seal 10 has a distinct ring known as the gate or injection point IP where the liquefied raw material is injected into the mold (not shown) during the injection molding process. This injection point IP causes a slight amount of unavoidable material distortion in this area of the seal 10 due to the nature of the injection molding process. To compensate for this distortion, the injection point IP is strategically located at the end wall 10*a* of the installed seal which faces in the direction of rotation of the anilox roller 22. (see FIG. 1B).

Figure 1B:
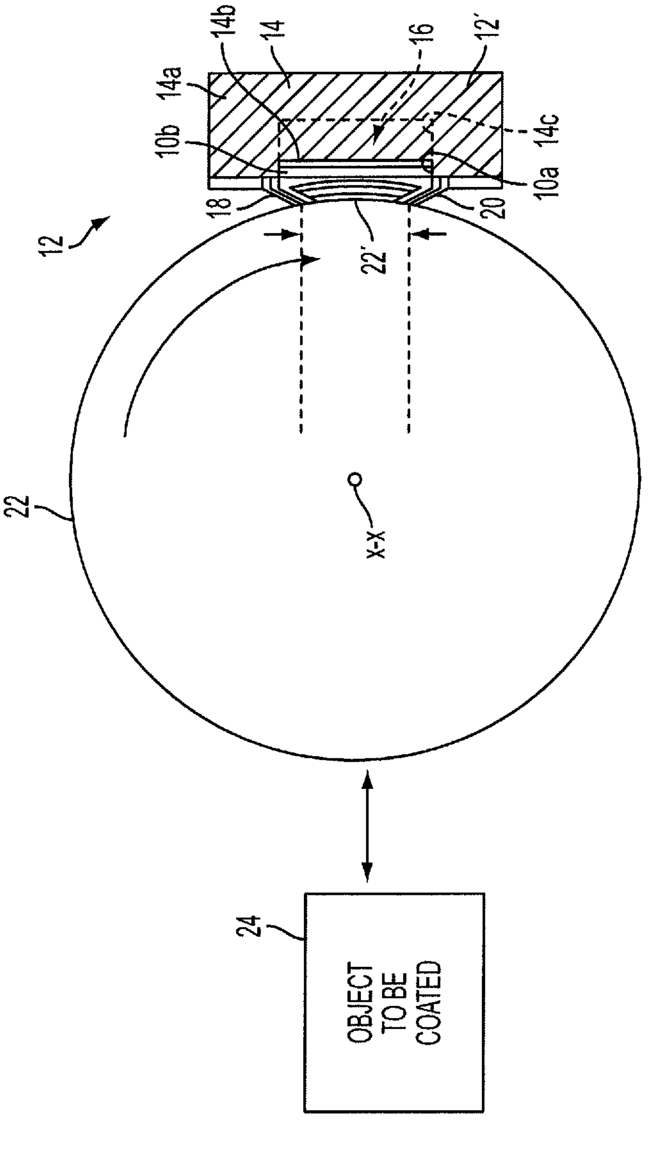
FIG. 1B is a reduced side elevational view of the doctor blade assembly and seal engaged with an anilox roller.
Figure 1C:
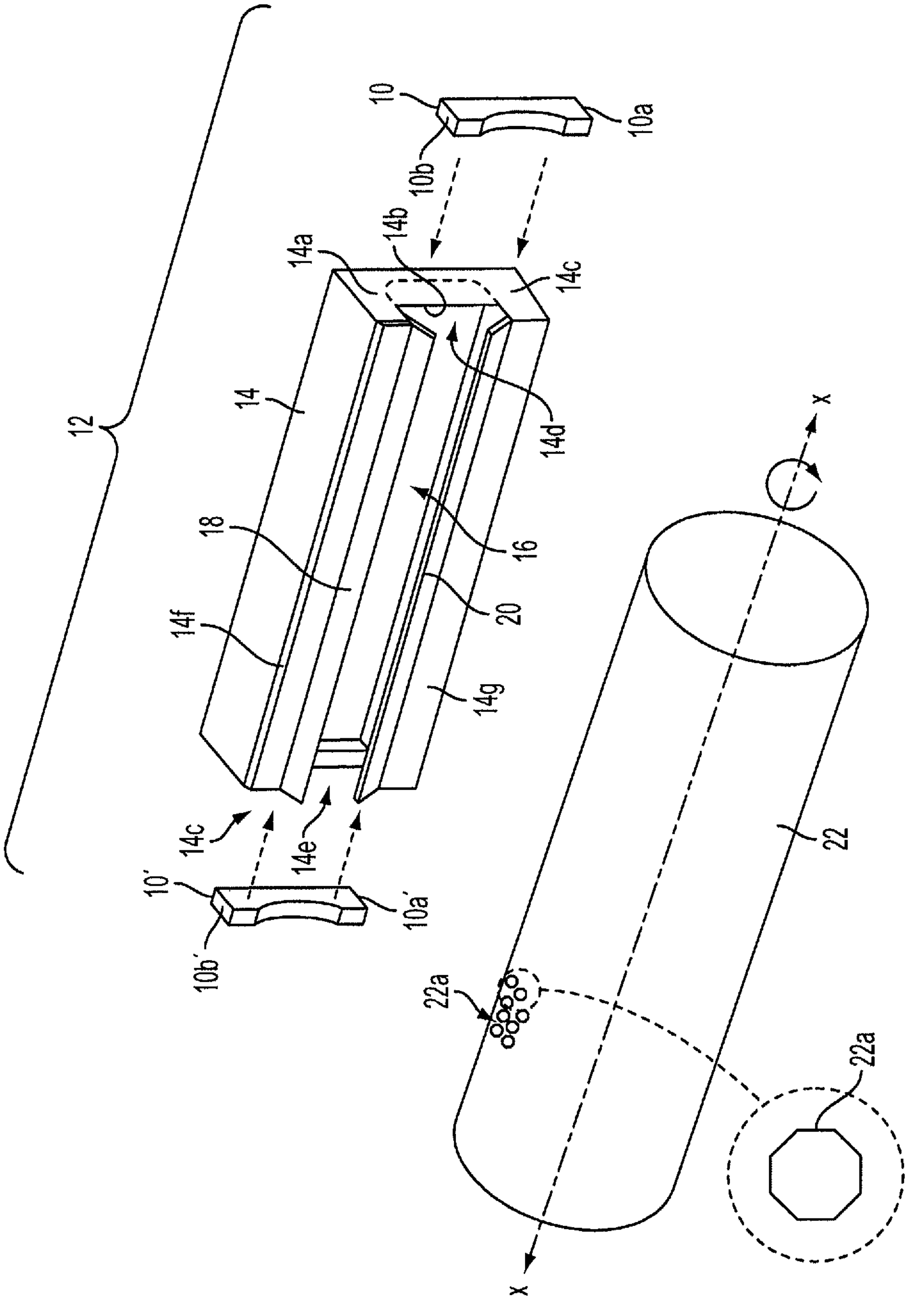
FIG. 1C is an assembly view of a doctor blade assembly and seals in spaced relation to a roller (not to scale)

As seen in FIG. 1C, a pair of seals 10, 10' are provided at each end 12*a*, 12*b* of a doctor blade assembly 12 having an elongated frame 14 forming a fluid reservoir 16 with first and second doctor blades 18, 20 affixed to frame walls 14*f,g* in spaced, parallel relation to each other and traversing substantially the entire length of frame 14. When doctor blade assembly 12 is engaged with an anilox roller 22 as seen in FIG. 1B, fluid reservoir 16 is defined and encapsulated by frame walls 14*a-c*, end seals 10, 10' and roller section 22' which extends between doctor blades 18, 20 (FIG. 1B) (it is of course understood the roller is rotating and that roller section 22' is that constantly changing surface section of the roller which at any given time extends between the doctor blades). As roller 22 rotates about axis x-x, roller surface section 22' comes into contact with the fluid contained in reservoir 16 (the reservoir fluid is represented by fluid shading lines in FIGS. 4 and 5) and thereby becomes coated. In the direction of rotation seen in FIG. 1B, the lower doctor blade 20 acts to meter the amount of fluid coated onto roller 22 as the just-coated roller surface exits assembly 12. The upper doctor blade 18 simply acts to seal off this edge of the reservoir although in some cases it may also end up scraping off some excess fluid from the roller before that section of the roller re-enters the reservoir 16.

Fluid coated onto the roller is transferred onto the object to be coated 24 (e.g., printing plate or transfer roller which in turn applies the ink to a web of material (not shown)) which is placed against a section of roller 22 which is annularly spaced from assembly 12, usually about 180° about the circumference of roller 22 from the doctor blade assembly 12.

Figure 3:
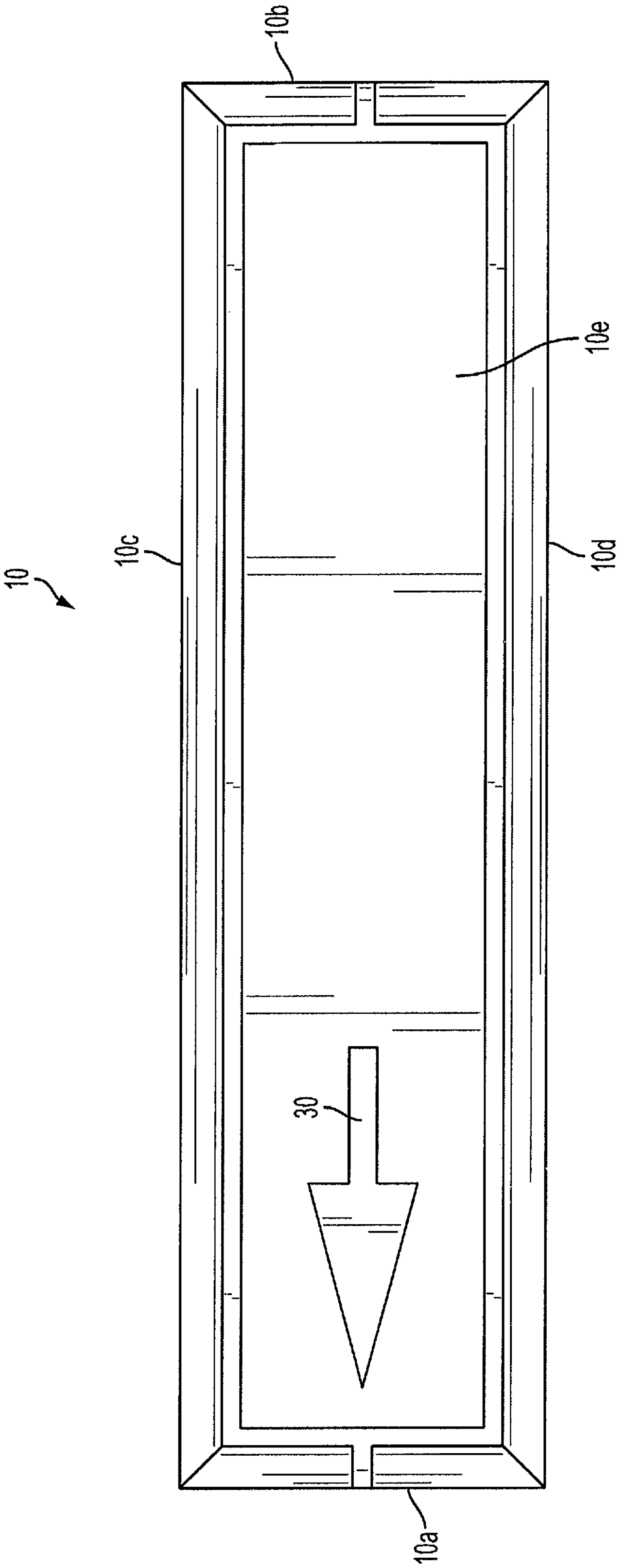
FIG. 3 is a bottom plan view thereof.

To assist in proper installation of seals 10, 10' into frame 14, a directional arrow 30 may be formed on seal rear wall 10*e* (FIG. 3). When seals 10, 10' are installed in the frame 14, the directional arrow 30 points in the direction the anilox roller 22 is rotating. Proper orientation of seals 10, 10' is essential to ensuring proper alignment with the doctor blades 18, 20 and the surface section 22' of the anilox roller 22.

As is well understood by those skilled in the art, the force of engagement of the doctor blades against the roller may be adjusted to provide the desired amount of fluid metering onto roller 22. Of course if rotation of roller 22 is reversed in FIG. 1B, upper doctor blade 18 meters fluid onto roller 22 while lower doctor blade 20 assists in containing the fluid in reservoir 16.

As seen best in FIGS. 1A and 3-7, seals 10 and 10' are configured to close off the opposite, open ends 14*d* and 14*e*, respectively, of frame 14 and doctor blades 18, 20. It is of course understood that second seal 10' is essentially identical to first seal 10 and description of one herein applies to the other.

Seal 10, which is preferably formed as a unitary structure, may be considered in terms of a base structure 40 and integral upper structure 50. Base structure 40 is a substantially rectangular block of material having bottom wall 10*e*, opposite first and second end walls 10*a*, 10*b*, and opposite first and second side walls 10*c*, 10*d*. Base structure 40 is sized and shaped to fit very snugly within the open end or channel 14*d* defined by frame walls 14*a*, 14*b* and 14*c* with upper structure 50 extending outward beyond the confines of frame walls 14*a*, 14*b* and 14*c*. As explained in more detail below, upper structure 50 forms that part of seal 10 which engages with anilox roller 22 and also doctor blades 18, 20 and is of a much more complex geometry than base structure 40.

Figure 4:
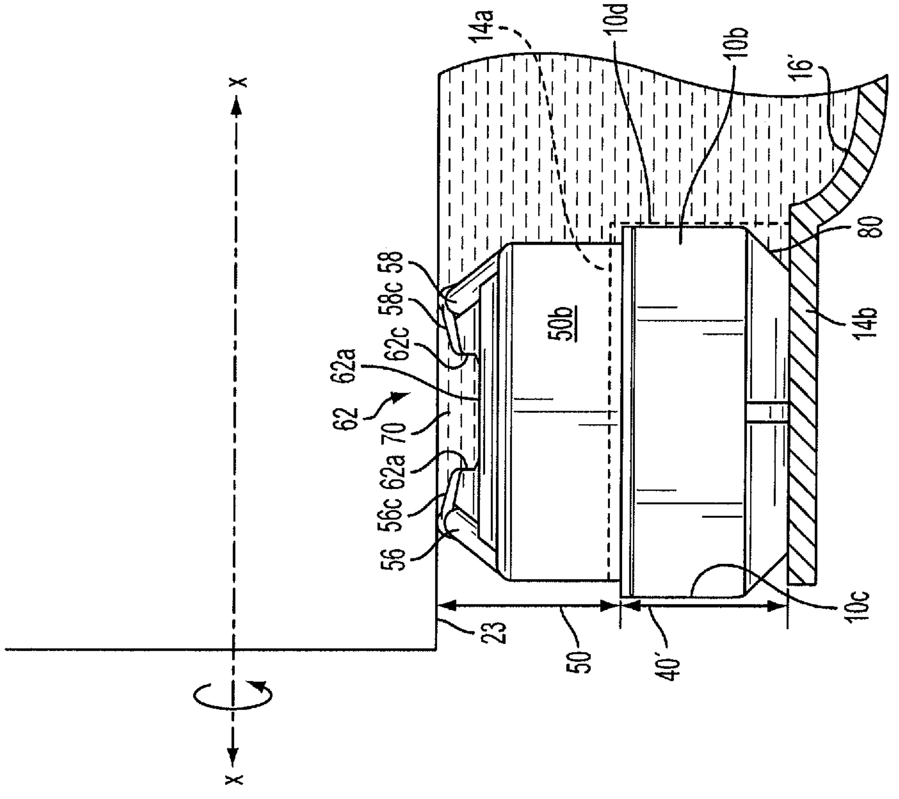
FIG. 4 is an end view thereof as viewed from the left in FIG. 2.
Figure 6:
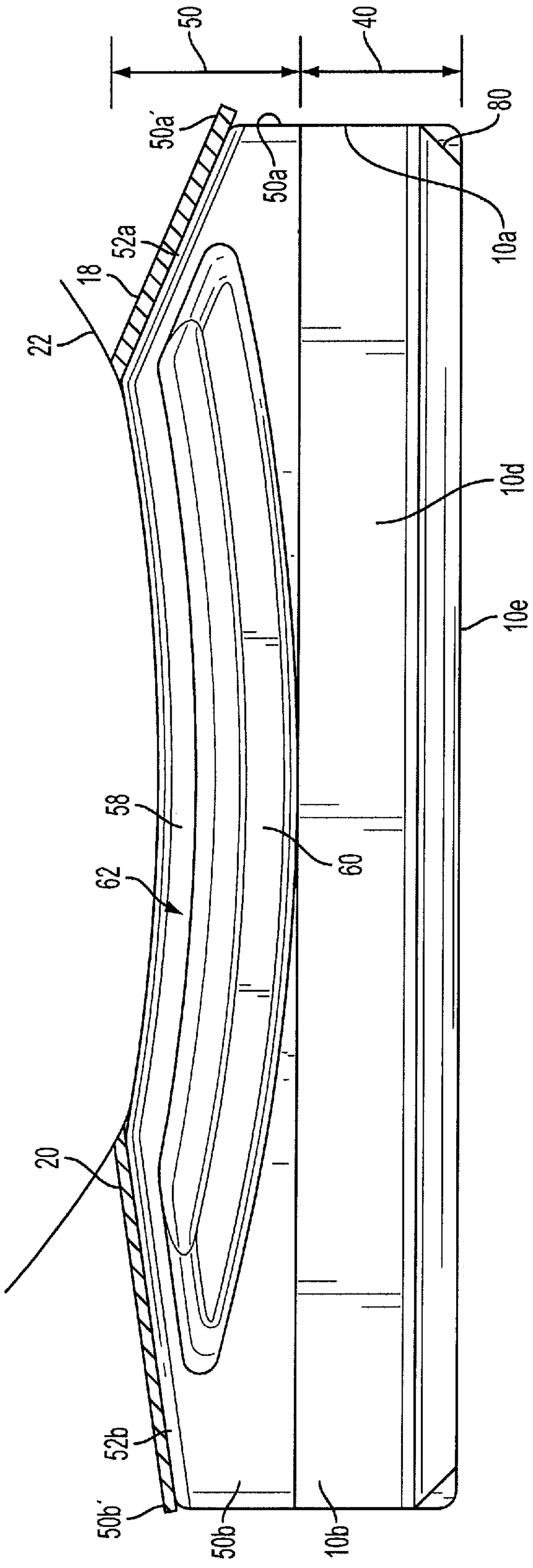
FIG. 6 is a side elevational view thereof.

More particularly, as seen in FIGS. 1A, 2 and 4-7, seal upper structure 50 includes opposite ends walls 50*a* and 50*b* which extend from and are slightly narrower than base end walls 10*a*, 10*b*, respectively, as seen best in FIGS. 1A, 4 and 5. Opposite end walls 50*a*, 50*b* include an upper edge 50*a*', 50*b*' which define an edge of upper end walls 52*a*, 52*b*, respectively. Upper end walls 52*a*, 52*b* are the surfaces against which blades 20,18 are positioned in contacting relationship, respectively (seen best in FIGS. 1D and 6). As seen in the top plan view of FIG. 2, upper end wall 52*a*, 52*b* each taper inwardly as they extend toward the center of seal 10 with upper end walls 52*a* and 52*b* connecting to the end walls 56*a*,58*a* and 56*b*,58*b* at opposite ends of a pair of first and second upper side walls 56, 58, respectively.

Figure 2:
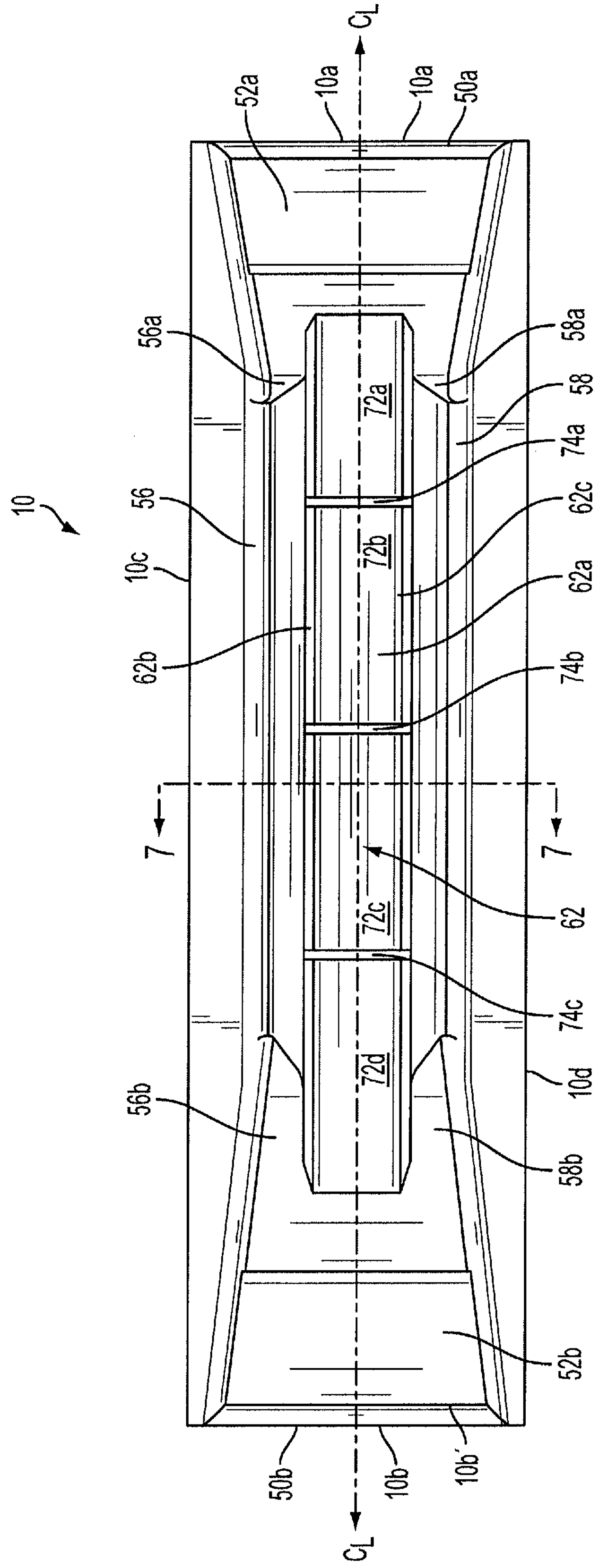
FIG. 2 is a top plan view of FIG. 1.
Figure 7:
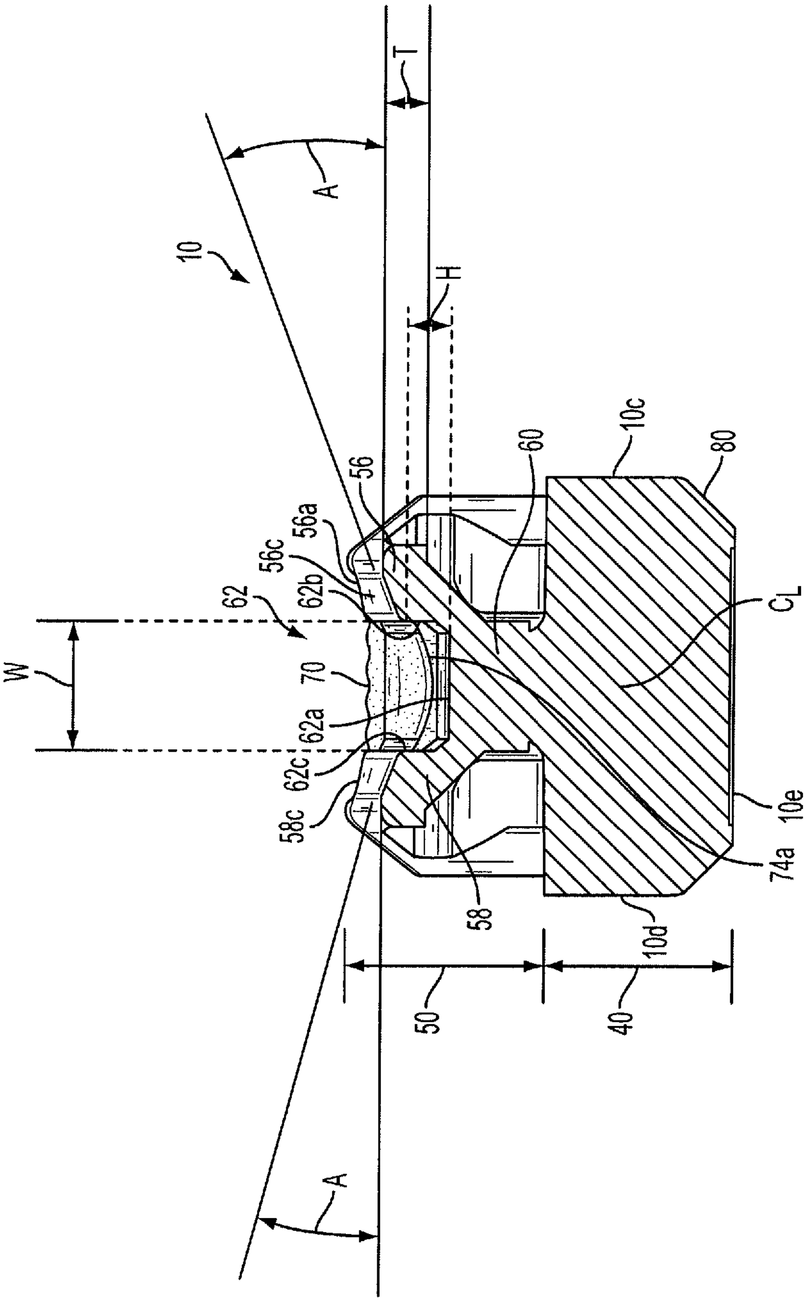
FIG. 7 is a cross-section view as taken generally along the line 7-7 in FIG. 2.

Upper side walls 56, 58 extend from a common center wall 60 which itself extends from and along the longitudinal center line $C_L$ of base structure 40 as seen best in the cross-sectional view of FIG. 7. Upper side walls 56, 58 diverge as they extend away from seal 10 and form a rectilinear lubrication channel 62 therebetween having a planar bottom wall 62*a* and opposite planar walls 62*b*, 62*c* extending substantially perpendicular to bottom wall 62*a*. If necessary for mold release purposes, a slight chamfer may be designed into the mold where the side walls 62*b*, 62*c* join the bottom wall 62*a*. As seen in FIG. 7, the width "W" of lubrication channel 62 is preferably larger than the height "H" thereof (the width "W" to height "H" referred to herein as the "depth to opening ratio"). The depth to opening ratio is important in directing lubricant to both the top surface of each side wall 62*b*, 62*c* as well as the surface of the anilox roller 22 when in the engaged, operational position. In the preferred embodiment, the depth to opening ratio is about 1:2 with "H" being about 0.100" and "W" is about 0.200" although these dimensions may of course vary depending on the size of the anilox roller and respective doctor blade assembly. Lubrication channel 62 is packed with a lubricant 70 (FIGS. 4, 5 and 7) prior to being installed into the assembly 12 and is designed to contain and distribute the lubricant 70 in a controlled and consistent manner. In one embodiment, to enhance controlled application of lubricant 70 to roller 22, at least two, but preferably four separate compartments 72*a*-72*d* may be defined in lubrication channel 62 by partitions such as the three restrictor webs 74*a*-74*c* (FIGS. 1A and 2). In this embodiment, webs 74*a*-74*c* extend substantially perpendicularly to bottom and side channel walls 62*a*-62*c* and extend the entire width W of lubrication channel 62. The top edge of each web may be straight or, more preferably, curved in a concave shape in the lateral direction as shown which helps to ensure an uninterrupted, longitudinally extending span of lubricant along the upper portion of the lubrication channel and lubrication delivery to surfaces 56*c* and 58*c* which require nearly constant lubrication to optimize the life expectancy and performance of the seal as described further below. The surface of the rotating anilox roller 22 which engages the seal picks up and carries a certain amount of the lubricant 70 contained within the lubrication channel 62 in the direction the roller is rotating. The restrictor webs 74*a*-74*c* divert the lubricant 70 laterally in each of the four compartments 72*a*-72*d* where the lubricant 70 is directed onto the smooth upper wall surface 56*c*, 58*c* of the sidewalls 56, 58, respectively, thereby greatly increasing the effective life of seal 10 by reducing the impact of abrasive/adhesive wear by providing constant lubrication to the surfaces of the seal 10 in contact with the surface of the anilox roller 22. This seal self-lubricating feature also greatly reduces the impact of the mechanical drag (friction) between the rotating anilox roller 22 and the surfaces of the seal 10 in contact therewith, thereby helping to ensure the seal remains in the optimum position relative to the surface of the anilox roller 22. The lubricant 70 reduces the COF (coefficient of friction) between the two surfaces in contact with one another and also acts as coolant.

The rigidity and geometry of the seal 10 with respect to the remainder of assembly 12 ensures that there is absolute minimal lateral (side to side) movement of the seal during normal operation of the roller machinery. When pressure changes occur while switching between printing and cleaning cycles, as well as the normal static hydraulic force the printing ink or other fluid applies to the seal 10 during normal operation, seal 10 maintains the optimum position relative to the surface of the anilox roller 22. Inhibiting or preventing such lateral movement is important in ensuring the lubricant 70 remains located within the lubrication channel 62 and is not sucked (negative pressure within the reservoir chamber 16) into the portion of the reservoir chamber 16 that contains the printing ink or other fluid (contamination of the ink and resultant negative printing issues) or forced out (positive pressure within the chamber 16) of the external side of the seal 10 where it can come in contact with other press components potentially damaging or causing them to fail.

The three restrictor webs 74*a*-74*c* further act to stabilize the two upper side walls 56,58. Restrictor webs 74*a*-74*c* hold the upper side walls 56,58 in a semi-fixed position, preventing excessive spreading thereof under load and unwanted release of lubricant 70 into the reservoir 16 or onto the press (or other machinery) components due to the normal static pressure applied by the ink or other fluid or when pressure changes occur within the reservoir 16 when switching between operational modes such as printing and cleaning cycles, for example.

The upper surfaces 56*c*, 58*c* of each upper side wall 56, 58 that in part define the lubrication channel 62 are substantially smooth, continuous surfaces, preferably about 0.010"-1.00", and more preferably about 0.100" in finished width. Each of these surfaces 56*c*, 58*c* are preferably formed at an angle "A" (FIG. 7) of about 5°-75°, and more preferably about 15°, descending toward the center of the lubrication channel 62. The angle "A" of decent of these two surfaces allows the lubricant 70 to flow from the lubrication channel 62 and enter the lateral areas 56*c*', 58*c*' (FIG. 5), as well as the microscopic cells 22*a* (which may be hexagonally shaped as seen in the enlarged circle of FIG. 1C) engraved into substantially the entire surface of the anilox roller 22. This distribution/penetration of the lubricant 70 provides constant lubrication to the two smooth surfaces 56*c*, 58*c*. It is noted that almost immediately after engagement with the anilox roller 22, lubricant is forced onto these surfaces 56*c*, 58*c* whereby during operational mode there is always a thin layer of lubricant between the seals 10, 10' and roller 22.

It is furthermore noted that as natural wear of the seal occurs during operation, the enclosed doctor blade assembly 12 is automatically advanced (biased) toward the surface of the anilox roller 22 to compensate for doctor blade and end seal wear. As the seal is brought closer to the surface of the anilox roller 22, the lubricant 70 in the four compartments 72*a*-72*d* within the lubrication channel 62 is consequently brought closer to the surface of the anilox roller 22 and distributed onto the two smooth surfaces 56*c*, 58*c* of the upper side walls 56, 58 as directed by the three restrictor webs 74*a*-74*c* and thereby keeping the smooth surfaces 56*c*, 58*c* lubricated and slowing the natural wear process of the seal 10.

As seen best in FIG. 7, the angled configuration of the upper side walls 56, 58 extending from a common center wall 60 helps to absorb the static and dynamic hydraulic pressure created within the reservoir 16 applied by the printing ink, cleaning solution or other fluids therein. The upper, laterally projecting segments of side walls 56, 58 which include the smooth surface 56*c*, 58*c* that contacts the surface of the anilox roller 22 is preferably manufactured to a finished thickness "T" (FIG. 7) of approximately 0.100", for example, overall to provide adequate material to accommodate the natural wear of the two surfaces 56*c*, 58*c* in contact with the surface of the anilox roller 22. This area of the upper side walls is beveled inward at the same angle A as the smooth surfaces on each of the side walls to provide a consistent, finished thickness of (e.g., approximately 0.100") across the width of the smooth surface 56*c*, 58*c* of side walls 56, 58, respectively.

Figure 1D:
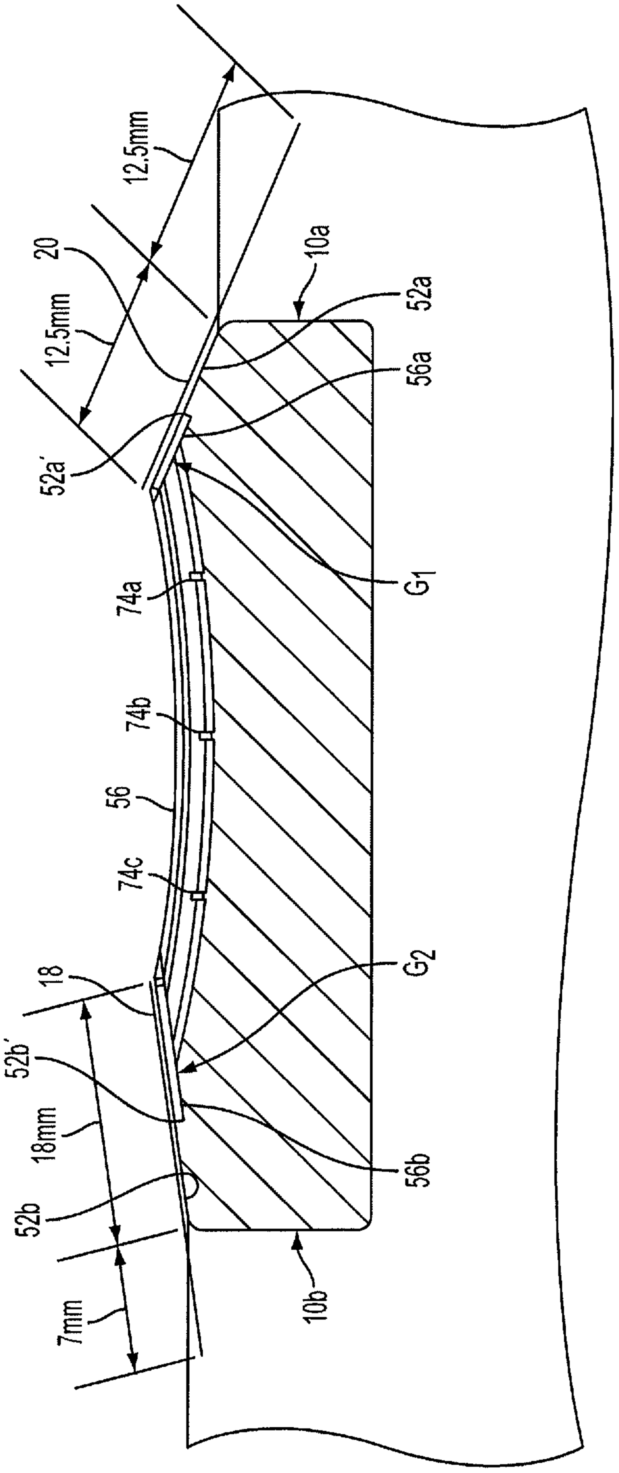
FIG. 1D is a longitudinal cross-sectional view as taken generally along the line 1D-1D in FIG. 1A.

As seen best in FIGS. 1A and 1D, surfaces 56*a*, 58*a* are not flush with adjoining surface 52*a* against which the doctor blade 20 seats, but rather are recessed slightly, stopping (e.g., approximately 0.020") prior to where the doctor blade 20 seats on the seal 10. Three interference strips 53*a*, 50*a*' and 53*b* border these surfaces and are manufactured to the minimum effective thickness possible. With surfaces 56*a*, 58*a* being slightly recessed from adjoining surface 52 whereon doctor blade 20 seats on the seal, a certain amount of the lubricant 70 is able to penetrate under the doctor blade 20 at the location of recessed surfaces 56*a*, 58*a* (the open gap "$G_1$" wherein lubricant may flow indicated in FIG. 1D). The thickness of the gap $G_1$ as measured from the recessed surfaces to the doctor blade 20 may be about 0.020", for example. Such penetration by the lubricant 70 has proven beneficial as it acts as a coolant and extends the effective life of the doctor blade by combating the frictional forces generated at the point of contact with the surface of the anilox roller 22. The step 52*a*' formed at the juncture of surfaces 52*a*, 56*a* and 58*a* acts as a barrier to prevent the lubricant from traveling any further under the doctor blade than noted above and thereby keeping the majority of the lubricant 70 in the lubrication channel where it is required.

The opposite end of the lubrication channel 62 supports the containment blade 18 on surface 52*b* and adjoining surfaces 56*b*, 58*b*. Three interference strips 53*a*', 50*b*' and 53*b*' border these surfaces and are manufactured to the minimum effective thickness possible. The open side of surfaces 56*a*, 58*a* without an interference strip is not flush with the containment blade but recessed, stopping approximately 0.400" prior to the point of where the containment blade is seated on the seal. With surfaces 56*b*, 58*b* side being slightly recessed from adjoining surface 52*b* whereon containment blade 18 seats, a certain amount of the lubricant 70 is able to penetrate under the containment blade 18 at the location of recessed surfaces 56*b*, 58*b* (the open gap "$G_2$" wherein lubricant may flow indicated in FIG. 1D). The thickness of the gap $G_2$ as measured from the recessed surfaces to the containment blade 18 may be about 0.020", for example. Such penetration by the lubricant has proven beneficial as it acts as a coolant and extends the effective life of the containment blade by combating the frictional forces generated at the point of contact with the surface of the anilox roller 22 as explained above. The step 52*b*' acts as a barrier to prevent the lubricant from traveling any further under the containment blade 18 than noted above, keeping the majority of the lubricant in the lubrication channel 62 where it is required.

The bottom wall 10*e* of seal has a bevel 80 of approximately 45 degrees. Beveling the perimeter of the base portion 40 makes it easier to position the seal for quick and easy insertion into the frame 14 without disturbing the lubricant 70 from within the lubrication channel 62.

What is claimed is:

1. An end seal (10) for removable attachment to a doctor blade assembly (12) having first and second doctor blades (18, 20) extending in spaced, parallel relation with a frame (14) defining a fluid reservoir (16) therebetween whereby a roller (22) may be positioned in operational engagement against said doctor blade assembly (12) for application of fluid from said fluid reservoir (16) onto said roller (22), said end seal (10) comprising:

a) a base structure (40) having a bottom wall (10*e*) and opposite first and second base end walls (10*a*, 10*b*) and opposite first and second base side walls (10*c*, 10*d*);

b) an upper structure (50) integrally formed with said base structure (40), said upper structure (50) including:

i.) a longitudinally extending center wall (60) extending from said base structure (40) in a direction away from said bottom wall (10*e*);

ii.) first and second diverging upper side walls (56, 58) extending from said center wall (6) and defining a rectilinear lubrication channel (62) therebetween for containing a lubricant, said lubrication channel (62) having a planar bottom wall (62*a*) and opposite planar side walls (62*b*, 62*c*) extending substantially perpendicular to said bottom wall (62*a*), first and second diverging upper side walls (56, 58) including respective upper wall surfaces (56*c*, 58*c*) defining lateral areas (56*c*', 58*c*'), wherein, each of respective upper wall surfaces (56*c*, 58*c*) are formed at an angle "A" descending toward said lubrication channel (62) and alignable to face said roller (22) when said seal (10) is attached to said frame (14) of said doctor blade assembly (12), and wherein said lateral areas (56*c*', 58*c*') are configured to be in fluid communication with said lubrication channel (62) when said seal (10) is attached to said frame (14) of said doctor blade assembly (12) and placed in operational engagement with said roller (22);

iii.) first and second opposite end walls (50*a*, 50*b*) extending from said first and second base end walls (10*a*, 10*b*); and iv.) first and second upper end walls (52*a*, 52*b*) extending from said first and second opposite end walls (50*a*, 50*b*), wherein said first and second upper end walls (52*a*, 52*b*) are configured to be aligned to thereby engage in contacting relation with said first and second doctor blades, respectively, when said seal (10) is attached to said frame (14) of said doctor blade assembly (12).

2. The seal (10) of claim 1 and further comprising end walls (56*a*, 58*a*) extending from and recessed with respect to said first upper end wall (52*a*), and end walls (56*b*, 58*b*) extending from and recessed with respect to said second upper end wall (52*b*), wherein said end walls (56*a*, 58*a*) and (56*b*, 58*b*) form a gap $G_1$ and $G_2$ with said first and second doctor blades, respectively, when said seal (10) is attached to said frame (14) of said doctor blade assembly (12), said gaps $G_1$ and $G_2$ configured to be in fluid communication with said lubrication channel (62) when said seal (10) is attached to said frame (14) of said doctor blade assembly (12) and placed in operational engagement with said roller (22).

3. The seal (10) of claim 2 and further comprising three interference strips (53*a*, 50*a*' and 53*b*) defining a border about end wall surfaces (56*a*, 58*a*) and said first upper end wall (52*a*), and three interference strips (53*a*', 50*b*' and 53*b*') defining a border about end wall surfaces (56*b*, 58*b*) and said second upper end wall (52*b*).

4. The seal (10) of claim 1 wherein said angle "A" of said first and second diverging upper side walls (56, 58) is about 5° to about 75°.

5. The seal (10) of claim 1 wherein said angle "A" of said first and second diverging upper side walls (56, 58) is about 15°.

6. The seal (10) of claim 1 and further comprising lubricant packed into said lubrication channel (62) prior to attachment to said doctor blade assembly (12).

7. The seal (10) of claim 1 wherein said bottom wall is beveled.

8. An end seal (10) for removable attachment to a doctor blade assembly (12) having first and second doctor blades (18, 20) extending in spaced, parallel relation with a frame (14) defining a fluid reservoir (16) therebetween whereby a roller (22) may be positioned in operational engagement against said doctor blade assembly (12) for application of fluid from said fluid reservoir (16) onto said roller (22), said end seal (10) comprising:

a) a base structure (40) having a bottom wall (10*e*) and opposite first and second base end walls (10*a*, 10*b*) and opposite first and second base side walls (10*c*, 10*d*);

b) an upper structure (50) integrally formed with said base structure (40), said upper structure (50) including:

i.) a longitudinally extending center wall (60) extending from said base structure (40) in a direction away from said bottom wall (10*e*);

ii.) first and second diverging upper side walls (56, 58) extending from said center wall (6) and defining a rectilinear lubrication channel (62) therebetween for containing a lubricant, said lubrication channel (62) having a planar bottom wall (62*a*) and opposite planar side walls (62*b*, 62*c*) extending substantially perpendicular to said bottom wall (62*a*), first and second diverging upper side walls (56, 58) including respective upper wall surfaces (56*c*, 58*c*) defining lateral areas (56*c*', 58*c*'), wherein, each of respective upper wall surfaces (56*c*, 58*c*) are formed at an angle "A" descending toward said lubrication channel (62) and alignable to face said roller (22) when said seal (10) is attached to said frame (14) of said doctor blade assembly (12), and wherein said lateral areas (56*c*', 58*c*') are configured to be in fluid communication with said lubrication channel (62) when said seal (10) is attached to said frame (14) of said doctor blade assembly (12) and placed in operational engagement with said roller (22);

iii.) first and second opposite end walls (50*a*, 50*b*) extending from said first and second base end walls (10*a*, 10*b*);

iv.) first and second upper end walls (52*a*, 52*b*) extending from said first and second opposite end walls (50*a*, 50*b*), wherein said first and second upper end walls (52*a*, 52*b*) are configured to be aligned to thereby engage in contacting relation with said first and second doctor blades, respectively, when said seal (10) is attached to said frame (14) of said doctor blade assembly (12); and v.) at least two separate lubrication compartments defined by at least one restrictor web extending substantially perpendicular to said channel bottom and side walls (62*a*-62*c*).

9. The seal (10) of claim 5 and further comprising lubricant packed into each of said lubrication compartments (74*a*-74*c*) prior to attachment to said doctor blade assembly (12).

10. An end seal (10) for removable attachment to a doctor blade assembly (12) having first and second doctor blades (18, 20) extending in spaced, parallel relation with a frame (14) defining a fluid reservoir (16) therebetween whereby a roller (22) may be positioned in operational engagement against said doctor blade assembly (12) for application of fluid from said fluid reservoir (16) onto said roller (22), said end seal (10) comprising:

a) a base structure (40) having a bottom wall (10*e*) and opposite first and second base end walls (10*a*, 10*b*) and opposite first and second base side walls (10*c*, 10*d*);

b) an upper structure (50) integrally formed with said base structure (40), said upper structure (50) including:

i.) a longitudinally extending center wall (60) extending from said base structure (40) in a direction away from said bottom wall (10*e*);

ii.) first and second diverging upper side walls (56, 58) extending from said center wall (6) and defining a rectilinear lubrication channel (62) therebetween for containing a lubricant, said lubrication channel (62) having a planar bottom wall (62*a*) and opposite planar side walls (62*b*, 62*c*) extending substantially perpendicular to said bottom wall (62*a*), first and second diverging upper side walls (56, 58) including respective upper wall surfaces (56*c*, 58*c*) defining lateral areas (56*c*', 58*c*'), wherein, each of respective upper wall surfaces (56*c*, 58*c*) are formed at an angle "A" descending toward said lubrication channel (62) and alignable to face said roller (22) when said seal (10) is attached to said frame (14) of said doctor blade assembly (12), and wherein said lateral areas (56*c*', 58*c*') are configured to be in fluid communication with said lubrication channel (62) when said seal (10) is attached to said frame (14) of said doctor blade assembly (12) and placed in operational engagement with said roller (22);

iii.) first and second opposite end walls (50_a_, 50_b_) extending from said first and second base end walls (10_a_, 10_b_);

iv.) first and second upper end walls (52_a_, 52_b_) extending from said first and second opposite end walls (50_a_, 50_b_), wherein said first and second upper end walls (52_a_, 52_b_) are configured to be aligned to thereby engage in contacting relation with said first and second doctor blades, respectively, when said seal (10) is attached to said frame (14) of said doctor blade assembly (12); and v.) at least four separate lubrication compartments (74_a_-74_c_) defined by at least three restrictor webs (74_a_-74_c_) extending substantially perpendicular to said channel bottom and side walls (62_a_-62_c_).

* * * * *